(12) United States Patent
Ichikawa et al.

(10) Patent No.: US 10,352,446 B2
(45) Date of Patent: Jul. 16, 2019

(54) COMBINED OIL CONTROL RING

(71) Applicant: KABUSHIKI KAISHA RIKEN, Tokyo (JP)

(72) Inventors: Takayuki Ichikawa, Kashiwazaki (JP); Takuma Sekiya, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 15/536,799

(22) PCT Filed: Dec. 22, 2015

(86) PCT No.: PCT/JP2015/085791
§ 371 (c)(1),
(2) Date: Jun. 16, 2017

(87) PCT Pub. No.: WO2016/111162
PCT Pub. Date: Jul. 14, 2016

(65) Prior Publication Data
US 2017/0350508 A1    Dec. 7, 2017

(30) Foreign Application Priority Data

Jan. 9, 2015  (JP) ................................. 2015-002946

(51) Int. Cl.
*C23C 8/02*  (2006.01)
*F16J 9/26*  (2006.01)
(Continued)

(52) U.S. Cl.
CPC ...................................... *F16J 9/26* (2013.01); *C23C 8/02* (2013.01); *C23C 8/26* (2013.01); *C23C 28/32* (2013.01);
(Continued)

(58) Field of Classification Search
CPC ..... F16J 9/26; F16J 9/065; C23C 8/02; C23C 8/26; F02F 5/00; C25D 5/50; C25D 5/36
See application file for complete search history.

(56) References Cited

U.S. PATENT DOCUMENTS 2,854,301 A  *  9/1958  Lutz .......................... F16J 9/063
                                                              267/1.5
2,904,377 A  *  9/1959  Endres ...................... F16J 9/068
                                                              267/1.5
(Continued)

FOREIGN PATENT DOCUMENTS

CN     104005877 A     8/2014
JP     53-147308 U     11/1978
(Continued)

OTHER PUBLICATIONS

Korean Office Action issued in Korean Application No. 10-2017-7022235 dated Sep. 8, 2017, with an English translation.
(Continued)

*Primary Examiner* — Eugene G Byrd
(74) *Attorney, Agent, or Firm* — Birch, Stewart, Kolasch & Birch, LLP

(57) ABSTRACT

A combined oil control ring comprising a pair of annular side rails each having a gap, and an axially corrugated spacer expander arranged between the side rails; the corrugated spacer expander having on the inside seating tabs for pushing inner peripheral surfaces of the side rails; the side-rail-pushing surface of each seating tab being provided with a nitrided layer; an entire surface of each spacer expander except for those provided with the nitrided layer being coated with a plating film; and the plating film having Vickers hardness HV0.01 of 300 or less.

10 Claims, 4 Drawing Sheets

(51) Int. Cl.
    *C23C 8/26*     (2006.01)
    *C25D 5/50*     (2006.01)
    *C25D 7/00*     (2006.01)
    *F02F 5/00*     (2006.01)
    *F16J 9/06*     (2006.01)
    *C25D 5/36*     (2006.01)
    *C23C 28/00*     (2006.01)
    *C25D 7/06*     (2006.01)

(52) U.S. Cl.
    CPC ............... *C23C 28/34* (2013.01); *C25D 5/36* (2013.01); *C25D 5/50* (2013.01); *C25D 7/00* (2013.01); *F02F 5/00* (2013.01); *F16J 9/06* (2013.01); *F16J 9/065* (2013.01); *C25D 7/0685* (2013.01)

(56) References Cited

U.S. PATENT DOCUMENTS

| | | | | |
|---|---|---|---|---|
| 3,695,622 | A * | 10/1972 | Davis | F16J 9/063 277/435 |
| 3,759,148 | A * | 9/1973 | Geffroy | F02F 3/00 277/451 |
| 4,111,437 | A * | 9/1978 | Saylor | F16J 9/066 277/435 |
| 4,115,959 | A * | 9/1978 | McCormick | C23C 4/10 51/295 |
| 4,194,747 | A * | 3/1980 | Nisper | F16J 9/069 267/1.5 |
| 4,429,885 | A * | 2/1984 | Chiba | F16J 9/068 267/1.5 |
| 4,542,907 | A * | 9/1985 | Chiba | F16J 9/067 267/1.5 |
| 4,548,416 | A * | 10/1985 | Maeda | F16J 9/069 267/1.5 |
| 4,759,266 | A * | 7/1988 | Murray | F16J 9/066 277/480 |
| 4,762,329 | A * | 8/1988 | Kooroki | F16J 9/066 267/1.5 |
| 5,129,661 | A * | 7/1992 | Ono | F16J 9/066 277/479 |
| 5,195,758 | A * | 3/1993 | Erway | F16J 9/066 267/1.5 |
| 5,469,616 | A * | 11/1995 | Miyazaki | F16J 9/066 29/888.07 |
| 5,718,437 | A * | 2/1998 | Tanaka | F16J 9/066 277/443 |
| 5,794,941 | A * | 8/1998 | Lahrman | F16J 9/063 277/441 |
| 5,974,871 | A | 11/1999 | Kanda et al. | |
| 7,036,823 | B2 * | 5/2006 | Takiguchi | F16J 9/064 277/434 |
| 7,044,472 | B2 * | 5/2006 | Takahashi | F16J 9/067 277/434 |
| 7,854,191 | B2 * | 12/2010 | Kariya | F16J 9/068 92/160 |
| 7,891,669 | B2 | 2/2011 | Araujo et al. | |
| 8,597,797 | B2 | 12/2013 | Sekiya et al. | |
| 8,835,549 | B2 | 9/2014 | Gao et al. | |
| 9,140,361 | B2 | 9/2015 | Takahashi et al. | |
| 9,353,864 | B2 | 5/2016 | Gao et al. | |
| 2002/0070507 | A1 * | 6/2002 | Heraud | F16J 9/062 277/434 |
| 2004/0262847 | A1 * | 12/2004 | Inoue | C23C 8/02 277/443 |
| 2006/0027976 | A1 * | 2/2006 | Usui | F16J 9/062 277/434 |
| 2006/0061043 | A1 | 3/2006 | Takahashi et al. | |
| 2006/0113730 | A1 * | 6/2006 | Suzuki | F16J 9/062 277/434 |
| 2006/0169135 | A1 * | 8/2006 | Usui | F16J 9/068 92/248 |
| 2008/0122185 | A1 * | 5/2008 | Katou | F16J 9/062 277/434 |
| 2009/0278320 | A1 | 11/2009 | Araujo et al. | |
| 2010/0295251 | A1 | 11/2010 | Sekiya et al. | |
| 2011/0221141 | A1 * | 9/2011 | Ayuzawa | F16J 9/068 277/434 |
| 2012/0235359 | A1 | 9/2012 | Gao et al. | |
| 2012/0245274 | A1 | 9/2012 | Gao et al. | |
| 2013/0181410 | A1 * | 7/2013 | Chiba | F16J 9/062 277/443 |
| 2014/0021686 | A1 * | 1/2014 | Takahashi | F16J 9/066 277/442 |
| 2015/0167844 | A1 | 6/2015 | Yabune et al. | |
| 2015/0240945 | A1 * | 8/2015 | Favaron | F16J 9/064 277/442 |

FOREIGN PATENT DOCUMENTS

| | | |
|---|---|---|
| JP | 10-311763 A | 11/1998 |
| JP | 2000-027995 A | 1/2000 |
| JP | 2002-206188 A | 7/2002 |
| JP | 2003-028299 A | 1/2003 |
| JP | 2003-286898 A | 10/2003 |
| JP | 2006-292021 A | 10/2006 |
| JP | 2006-300224 A | 11/2006 |
| JP | 4323456 B2 | 9/2009 |
| JP | 2011-122060 A | 6/2011 |
| JP | 2014-9776 A | 1/2014 |
| JP | 5463364 B2 | 4/2014 |
| WO | WO 2005/040645 A1 | 5/2005 |
| WO | WO 2008/059791 A1 | 5/2008 |
| WO | WO 2012/133714 A1 | 10/2012 |

OTHER PUBLICATIONS

International Search Report (PCT/ISA/210) issued in PCT/JP2015/085791, dated Feb. 9, 2016.
Office Action issued in Japanese Patent Application No. 2015-002946 dated Apr. 12, 2016.
Written Opinion (PCT/ISA/237) issued in PCT/JP2015/085791, dated Feb. 9, 2016.
European Patent Office Communication pursuant to Article 94(3) EPC issued in the corresponding European Patent Application No. 15 877 035.4 on Feb. 5, 2019.

* cited by examiner

COMBINED OIL CONTROL RING

FIELD OF THE INVENTION

The present invention relates to a combined oil control ring attached to an engine piston for oil control, which may also be called "combined oil ring" or "oil ring."

BACKGROUND OF THE INVENTION

With the reduction of $CO_2$ emission recently required to prevent global warming, fuel efficiency has been improved in automobile engines. For this purpose, improvement has been made to reduce the friction of sliding portions in a piston system.

Tension reduction is important in piston rings, particularly in oil rings whose tension occupies 50% or more of the entire tension of piston rings. To this end, the tolerance range reduction of the tension is also required.

However, the improvement of combustion efficiency by the elevation of combustion temperatures or by the direct injection of fuel causes the problems that oil sludge generated due to the degradation of engine-lubricating oils is stuck to side rails and spacer expanders, and that side rails and seating tabs of spacer expanders coming into contact with inner peripheral surfaces of the side rails are worn.

The tension reduction of oil rings results in decrease in conformability to cylinder wall surfaces, drastically increasing oil consumption, and the sticking and wearing of oil rings.

With respect to conformability, a method of increasing a conformability coefficient by reducing the widths of side rails has been proposed. With respect to the sticking of oil rings, a method of forming an oil-repellent film such as a fluorine-containing film on the oil ring surface has been proposed. With respect to wearing, a method of plating chromium on oil rings, and a method of nitriding oil rings have been proposed.

With respect to the width reduction of a piston ring, Patent Reference 1 specifically discloses a compression ring as wide as 1.0 mm or less, and a combined oil control ring as wide as 2.0 mm or less.

With respect to the sticking of an oil ring, Patent Reference 2 discloses a method for forming an oil-repellent coating by a sol-gel method from a metal alkoxide and fluoroalkyl-substituted metal alkoxide, in which part of alkoxy groups are substituted by fluoroalkyl groups.

With respect to wearing, Patent Reference 3 discloses the nitriding of a spacer expander, and WO 2005/040645 discloses the formation of a gas-nitrided layer as thick as 10-60 μm, which contains special S phases having peaks at $2\theta=40°$ and $46°$, respectively, in X-ray diffraction with Cu-Kα, as a nitrided layer having excellent corrosion resistance.

However, increase in the area and thickness of a nitrided layer leads to increase in the Young's modulus and developed length (circumferential length) of a spacer expander, resulting in larger variation of tension, and thus making it difficult to nitride a spacer expander within a predetermined accuracy range. For example, when a nitrided layer as thick as 30 μm is formed by gas-phase nitriding on an entire surface of the spacer expander, the tension increases 18 N than before forming the nitrided layer, resulting in difficulty in controlling the tension.

To reduce the variation of tension, Patent Reference 5 teaches a method for producing a spacer expander comprising a first step of forming a nitridation-preventing layer of Ni, Cr or Cu as thick as 1-5 μm on a surface of a wire for a spacer expander, a second step of providing the wire with a corrugated shape by using gears, a third step of forming seating tabs by shearing on an inner peripheral surface of the corrugated wire, and a fourth step of nitriding the sheared surfaces. The base material of a spacer expander body, particularly its corrugated corner portions, is exposed by gear rolling, in case that Ni plating layers on the corrugated corner portions are cracked, peeled, or made thin. To prevent the base material from being exposed, Patent Reference 6 teaches that other surfaces than the sheared surfaces should be covered with a Ni plating film as thick as 1-7 μm having a Ni-diffused layer.

Patent Reference 7 teaches that the Ni plating film suppresses the sticking of oil sludge, because of its surface free energy and hydrogen bonding force.

As described above, it has been confirmed that a Ni plating film well functions as a nitridation-preventing film or an anti-sticking film. However, the Ni plating film per se may be chipped or peeled depending on the production conditions, practically needing further investigation of the preferred structure of a Ni plating film.

PRIOR ART REFERENCES

Patent Reference 1: JP 2003-286898 A
Patent Reference 2: JP 2000-27995 A
Patent Reference 3: JU 53-147308 A
Patent Reference 4: WO 2005/040645
Patent Reference 5: JP 2003-28299 A
Patent Reference 6: JP 4,323,456 B
Patent Reference 7: JP 5,463,364 B
Patent Reference 8: JP 2011-122060 A
Patent Reference 9: JP 10-311763 A

OBJECT OF THE INVENTION

An object of the present invention is to provide a combined oil control ring having low tension with small variation, as well as excellent wear resistance and sludge resistance.

DISCLOSURE OF THE INVENTION

As a result of intensive research on the structure of a plating film formed on a spacer expander in a combined oil control ring, the inventors have found that a plating film free from defects and not suffering chipping and peeling can be formed by adjusting its crystal orientations and its structure in predetermined ranges.

Thus, the combined oil control ring of the present invention comprises a pair of annular side rails each having a gap, and an axially corrugated spacer expander arranged between the annular side rails;

the corrugated spacer expander having on the inside seating tabs for pushing an inner peripheral surface of each side rail;

the side-rail-pushing surface of each seating tab being provided with a nitrided layer;

an entire surface of the spacer expander except for those provided with the nitrided layer being coated with a plating film; and the plating film having Vickers hardness HV0.01 of 300 or less.

In an X-ray diffraction profile of a plating film surface, a ratio $[I_{(111)}/I_{(200)}]$ of a diffraction intensity $I_{(111)}$ of a (111) plane to a diffraction intensity $I_{(200)}$ of a (200) plane is preferably 2.0 or less. The texture coefficient of the (200) plane is preferably 1.1 or more.

The plating film preferably does not contain columnar crystals having an average diameter of less than 0.2 μm.

The plating film is preferably as thick as 1-7 μm.

The plating film preferably has centerline average surface roughness $Ra_{75}$ of 0.005-0.4 μm.

The plating film is preferably a Ni plating film.

In the combined oil control ring of the present invention, the nitrided layer is preferably as thick as 30 μm or more.

The combined oil control ring of the present invention preferably has combined tension of 5-20 N.

DESCRIPTION OF THE PREFERRED EMBODIMENTS

The combined oil ring, particularly the oil ring having a Ni plating film, of the present invention will be explained in detail below.

Figure 1:
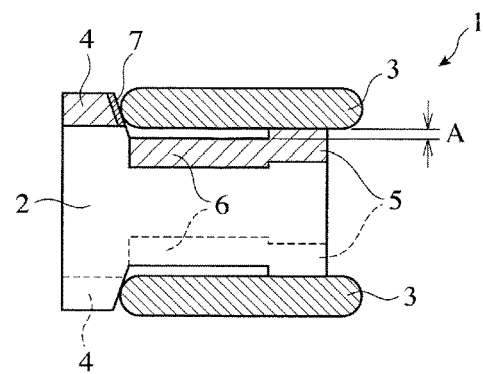
FIG. 1 is a cross-sectional view showing the combined oil control ring of the present invention.
Figure 2:
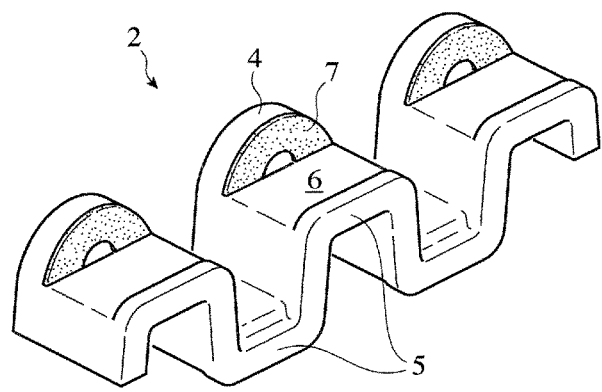
FIG. 2 is a partial perspective view showing the combined oil control ring of the present invention.

FIG. 1 shows a combined oil control ring, and FIG. 2 is a perspective view showing part of a spacer expander. The combined oil control ring 1 comprises a pair of annular side rails 3, 3 each having a gap, and a spacer expander 2 supporting the side rails 3, 3; the spacer expander 2 having on the inside seating tabs 4 for pushing inner peripheral surfaces of the side rails 3, 3, and if necessary, axially projecting support portions 5 for supporting the side rails 3, 3 on the outside. When the support portions 5 are provided, a connecting portion of each seating tab 4 and each support portion 5 is called an intermediate portion 6. In the present invention, a side-rail-pushing surface 7 of the seating tab 4 is provided with a nitrided layer, and an entire surface of the spacer expander except for those having the nitrided layer is coated with a Ni plating film.

Figure 3:
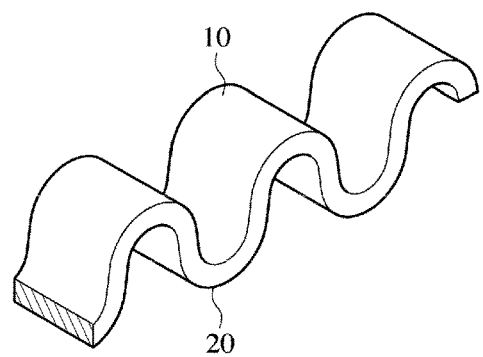
FIG. 3 is a partial perspective view showing a longitudinally corrugated hoop-forming strip.

The Ni plating film is formed on a belt-like hoop wire before formed into a spacer expander. The spacer expander is produced by providing a Ni-plated belt-like hoop wire with an axially corrugated form, such that it has continuous upper portions 10 and lower portions 20 as shown in FIG. 3, and then forming seating tabs 4 in the upper and lower portions 10, 20 on their inside, and support portions 5 and intermediate portions 6 on their outside as shown in FIG. 2. By this forming process, each seating tab 4 is provided with a sheared surface free of the Ni plating film on the side facing the intermediate portion 6. The nitrided layer is formed only on the sheared surfaces (side-rail-pushing surfaces 7). In order that the Ni plating film on other portions acts as a nitridation-preventing film, the Ni plating film should be free from such defects as chipping and peeling, even after the belt-like hoop wire is formed into spacer expander.

The as-plated Ni film of the present invention has Vickers hardness HV0.01 of about 350-550. Because hardness on this level provides as small elongation as about 6%, the Ni plating film may be chipped or peeled when a spacer expander is formed. Accordingly, heat treatment is carried out to reduce the hardness HV0.01 of the Ni plating film to 300 or less. The heat treatment is preferably conducted at a temperature of 500-700° C. in a non-oxidizing atmosphere (for example, $N_2$ atmosphere). Taking productivity into consideration, the heat treatment is more preferably conducted at a temperature of 550° C. or higher for 1 minute or less. The concentration of oxygen in the non-oxidizing atmosphere is preferably 200 ppm or less. The Ni plating film subjected to such heat treatment has hardness HFV0.01 of more preferably 270 or less, further preferably 250 or less. For example, when the hardness HV0.01 is 250 or less, it is said that the Ni plating film has elongation of 10% or more.

In the present invention, in an X-ray diffraction profile of a surface of the heat-treated Ni plating film, a ratio $[I_{(111)}/I_{(200)}]$ of the diffraction intensity $I_{(111)}$ of a (111) plane to the diffraction intensity $I_{(200)}$ of a (200) plane is preferably 2.0 or less, more preferably 1.8 or less. The diffraction intensity $I_{(200)}$ of a (200) plane is further preferably maximum. When the diffraction intensity $I_{(200)}$ of a (200) plane is maximum, the ratio $[I_{(111)}/I_{(200)}]$ is preferably 0.8 or less.

The texture coefficient of a (200) plane is preferably 1.1 or more. The texture coefficient of a (hkl) plane is generally defined by:

$$\text{Texture coefficient of } (hkl) \text{ plane} = I_{(hkl)}/I_{0(hkl)} \cdot [(1/n) \cdot \Sigma((I_{(hkl)}/I_{0(hkl)}))]^{-1} \quad (1),$$

wherein $I_{(hkl)}$ represents a measured X-ray diffraction intensity of a (hkl) plane (expressed by a relative value when the maximum measured X-ray diffraction intensity is regarded as 100), and $I_{0(hkl)}$ represents a standard X-ray diffraction intensity described in JCPDS File No. A 04-0850. Though the standard X-ray diffraction intensities of eight types of (hkl) planes of (1 11), (200), (220), (311), (222), (400), (331) and (420) are listed in File No. A 04-0850, the present invention uses for simplicity only the X-ray diffraction intensities of three types of (hkl) planes [(111), (200) and (220) planes], to define the texture coefficient. In the present invention, accordingly, the definition of the texture coefficient is as follows:

$$\text{Texture coefficient of } (hkl) \text{ plane} = I_{(hkl)}/I_{0(hkl)} \cdot [\tfrac{1}{3}(I_{(111)}/I_{0(111)} + I_{(200)}/I_{0(200)} + I_{(220)}/I_{0(220)})]^{-1} \quad (2).$$

$I_{0(111)}$ is 100, $I_{0(200)}$ is 42, and $I_{0(220)}$ is 21. The texture coefficient of a (200) plane is more preferably 1.2 or more, further preferably 1.3 or more. When the diffraction intensity $I_{(200)}$ of a (200) plane is maximum, the texture coefficient of a (200) plane is further preferably 1.8 or more.

The Ni plating film of the present invention preferably does not have columnar crystals penetrating the film in a thickness direction, and also preferably does not have columnar crystals having an average diameter of less than 0.2 μm. In the present invention, the columnar structure has an aspect ratio (length/diameter) of 2 or more, and those having aspect ratios of less than 2 are categorized in the granular structure. Though heat treatment causes recrystallization in the Ni plating film of the present invention, it is preferable that crystals grow to proper sizes with few defects. Accordingly, the Ni plating film is preferably constituted by granular crystals having an average grain size of 0.2-3 μm and/or columnar crystals having an average diameter of 0.2-3 μm. The average grain size of granular crystals is more preferably 0.3-2 μm, further preferably 0.5-1.5 μm. The average diameter of columnar crystals is more preferably 0.3-2 μm, further preferably 0.5-1.5 μm. The average grain size and the average diameter can be determined by the image analysis of granular crystals and columnar crystals.

In the present invention, the thickness of the Ni plating film is preferably 1-7 μm, more preferably 3-6.5 μm, further preferably 4-6 μm.

With respect to the problem of oil sludge, the reduction of a gap width of a top ring for reducing a blowby gas to suppress the deterioration of an engine oil, and the formation of a coating on a spacer expander and side rails to make sludge less attachable to them are effective. In this respect, as described in Patent Reference 7, it is effective to form the Ni plating film on an entire surface of the spacer expander except for the side-rail-pushing surfaces of seating tabs, because the Ni plating film has a function of suppressing the sticking of oil sludge. Further, oil sludge resistance can be improved by adjusting the centerline-average surface roughness $Ra_{75}$ of this Ni plating film to 0.005-0.4 μm. A mirror-polished surface is of course preferable, and a glossy Ni plating film can have surface roughness within this range. The surface roughness $Ra_{75}$ of the Ni plating film is more preferably 0.005-0.25 μm, further preferably 0.005-0.15 μm.

Oil sludge is easily attached to and accumulated particularly in narrow space between an intermediate portion 6 of the spacer expander 2 and each side rail 3, 3. Accordingly, in the combined oil control ring of the present invention, the axial width (A) of the support portion 5 is preferably 0.07 mm or more, more preferably 0.09 mm or more, further preferably 0.11 mm or more, from the structural point of view.

A nitrided layer formed on the side-rail-pushing surfaces 7 of the spacer expander seating tabs 4 is preferably as thick as 30 μm or more, more preferably 35 μm or more, further preferably 40 μm or more, from the aspect of wear resistance. From the aspect of productivity, the upper limit is preferably 60 μm.

Because the nitrided layer is formed only on the side-rail-pushing surfaces of the spacer expander as described above in detail, the combined oil control ring of the present invention has low tension with small variation, so that the combined tension can be as small as 5-20 N.

Though not restrictive, the spacer expander substrate (base material) is made of austenitic stainless steel such as SUS304, in the present invention. Because the substrate is covered with a passive film, it is preferably electrolytically degreased by electrolytic polishing with hydrochloric acid, activated by washing with hydrochloric acid, and then subjected to Ni strike plating in a Wood's bath, as pretreatments for the Ni plating film. Ni plating can be conducted in various baths such as a Watts bath, a sulfamate bath, etc. Because of bending to a spacer expander, dispersion-reinforced plating is not preferable, and the amounts of additives such as a gloss agent, etc. are preferably minimum necessary for securing predetermined surface roughness and uniform thickness. In order that the Ni plating film does not have columnar crystals penetrating in a thickness direction, Ni plating is preferably carried out by 2 or more steps under different conditions. In this respect, semi-glossy Ni plating film and further glossy Ni plating film are preferably carried out after Ni strike plating.

As long as Ni strike plating is carried out as a pretreatment, a diffusion phase is not required between the substrate and the Ni plating film in the present invention, though a diffusion phase formed by a softening heat treatment for hardness adjustment is preferable without causing any problem. A diffusion phase formed by a heat treatment at 550° C. or higher within 1 minute for productivity covers the substrate only locally or is extremely thin. A Ni plating film formed through Ni strike plating and having a structure with a high (200) plane ratio would sufficiently act as a nitridation-preventing film, even if the diffusion phase were not formed.

A belt-like hoop wire coated with the above Ni plating film is formed into spacer expanders, through gear-forming including local bending and the formation of seating tabs by shearing, coiling, cutting to a predetermined length, and finishing of gap surface portions. Because the seating tabs are formed by a gear-forming step of upper and lower portions, and then a shearing step on the inside, the seating tabs do not have a Ni plating film on their side-rail-pushing surfaces. If a Ni plating film were too thick, it may remain on part of the pushing surfaces, but there would be no problem if its thickness were within 10 μm. The tension of the spacer expander can be controlled by adjusting its developed length, though it is important that the spacer expander has an accurate shape and suppressed variation of the developed length.

To form a nitrided layer as thick as 30 μm or more, gas-phase nitriding using an $NH_3$-containing gas is preferable in the present invention. Salt-bath nitriding may be used, though it is difficult to form a thick nitrided layer. When the substrate of the spacer expander is made of SUS304, it is preferable to add ammonium chloride at predetermined timing before nitriding, to reduce its passive film. The nitriding temperature is preferably 470-600° C., and the nitriding time is determinable depending on the desired thickness of the nitrided layer.

Example 1

[1] Ni Plating

A belt-like hoop wire of SUS304 rolled to 2.50 mm×0.25 mm (0.3 R at ends) was plated with Ni under the following conditions.

Pretreatments: Electrolytic degreasing, activation with acid, and Ni strike plating.

Ni-plating bath: A semi-glossy Ni-plating bath (Ni sulfamate solution+Ni chloride+boric acid+additive A), and a glossy Ni-plating bath (Ni sulfamate solution+Ni chloride+boric acid+additive B).

Bath temperature: 50° C.

Initial pH: 2.8.

Current density: 8 A/dm$^2$.

Time: 60 seconds for semi-glossy Ni plating, and 30 seconds for glossy Ni plating.

[2] Heat Treatment

The Ni-plated hoop wire was cleaned with warm water, dried, and then subjected to a softening heat treatment at 600° C. for 30 seconds in an $N_2$ atmosphere (oxygen concentration: 50 ppm).

[3] Measurement of Hardness

The hardness of a mirror-polished surface of the Ni plating film was measured at a test force of 0.098 N (10 g) using a micro-Vickers hardness tester. The hardness HV0.01 of the Ni plating film of Example 1 was 435 before the heat treatment, and 245 after the heat treatment.

[4] Measurement of Surface Roughness

The centerline-average surface roughness $Ra_{75}$ of a heat-treated hoop-forming strip was measured by a stylus-type surface roughness meter. The centerline-average roughness $Ra_{75}$ of Example 1 was 0.16 μm.

[5] X-Ray Diffraction Measurement

Figure 4:
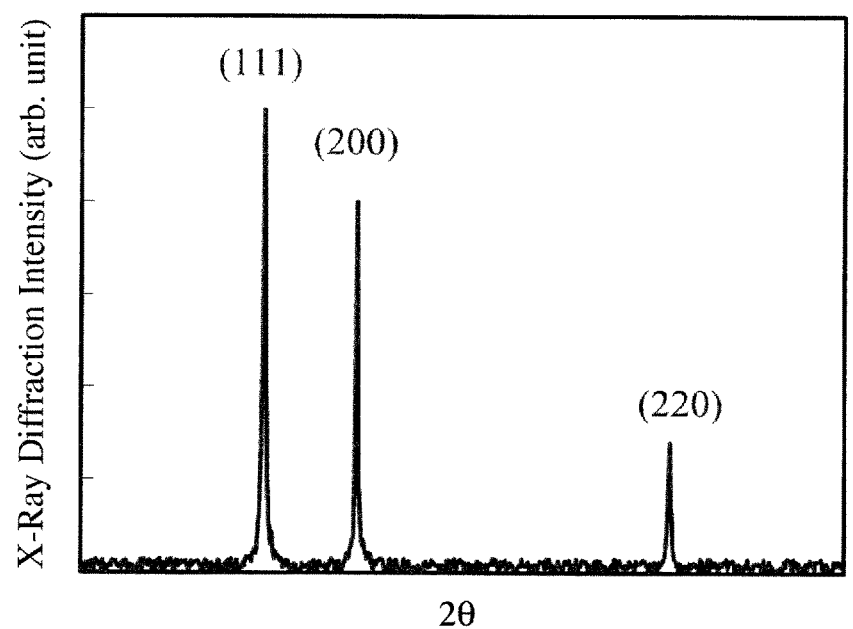
FIG. 4 is a graph showing an X-ray diffraction profile of a Ni plating film obtained in Example 1.

The X-ray diffraction intensity of the mirror-polished surface was measured with Cu-Kα rays at tube voltage of 40 kV and tube current of 30 mA, in a range of 2θ=35-90°, which covered all of the (111), (200) and (220) planes of Ni. FIG. 4 shows an X-ray diffraction profile in Example 1. With the maximum intensity among three diffraction intensities assumed as 100, each diffraction intensity of (111), (200) and (220) was determined to calculate a ratio $[I_{(111)}/I_{(200)}]$ of the diffraction intensity $I_{(111)}$ of the (111) plane to the diffraction intensity $I_{(200)}$ of the (200) plane, and a texture coefficient of the (200) plane. In Example 1, $I_{(111)}/I_{(200)}$ was 1.25, and the texture coefficient of a (200) plane was 1.35.

[6] Thickness Measurement and Structure Observation of Ni Plating Film

Figure 5:
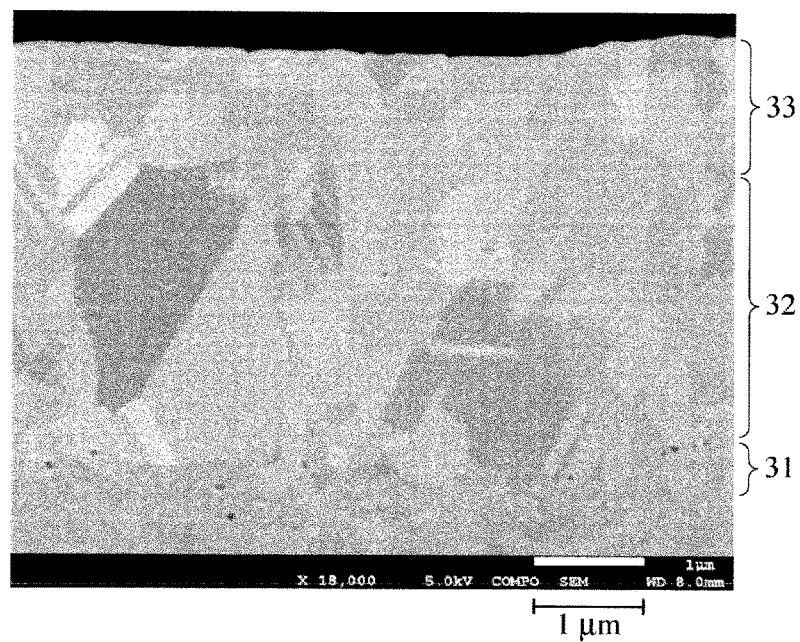
FIG. 5 is a SEM photograph showing a cross section of the Ni plating film of Example 1.

Thickness measurement and structure observation were conducted on a scanning electron photomicrograph (SEM photograph) of a mirror-polished cross section perpendicular to the coating surface. FIG. 5 is a SEM photograph. The Ni plating film of Example 1 as thick as about 5 min was constituted by a Ni strike plating layer 31, a semi-glossy Ni plating layer 32, and a glossy Ni plating layer 33. The Ni plating film was also free from columnar crystals penetrating the film in a thickness direction, and columnar crystals having an average diameter of less than 0.2 μm. Incidentally, the granular structure had an average grain size of 0.8 μm.

[7] Formation of Spacer Expander and Side Rail

A spacer expander was formed from the above Ni-plated hoop wire by a usual gear-forming method, to provide a combined oil control ring having a nominal diameter of 82.5 mm, a combined nominal width of 2.5 mm, a combined thickness of 2.8 mm, and tension of 23±3.0 N. A side rail was formed by coiling from a belt-like hoop wire of SUS440B rolled to 2.30 mm×0.40 mm (0.3 R at ends), ion-plated with CrN on its outer peripheral surface, and further coated with an oil-sludge-resistant composition containing C6FMA, PolySiMA and SiMA described in Patent Reference 8 on its entire surface.

[8] Gas-Phase Nitridation

After cleaning for degreasing, the side-rail-pushing surfaces of seating tabs of the spacer expander were nitrided at 570° C. for 80 minutes in a gas-phase nitriding atmosphere ($NH_3$: 90%, and $N_2$: 10%). The nitrided layer was as thick as 27 μm.

[9] Measurement of Tension 20 sets of combined oil control ring samples for tension measurement were prepared, and tension measurement was conducted by a tensiometer described in Patent Reference 9. The tension was 22.91 N on average with standard deviation of 0.31 N, the process capability index Cp was 3.23, and the process capability index Cpk was 3.13.

Examples 2-5, and Comparative Examples 1-3

Figure 6:
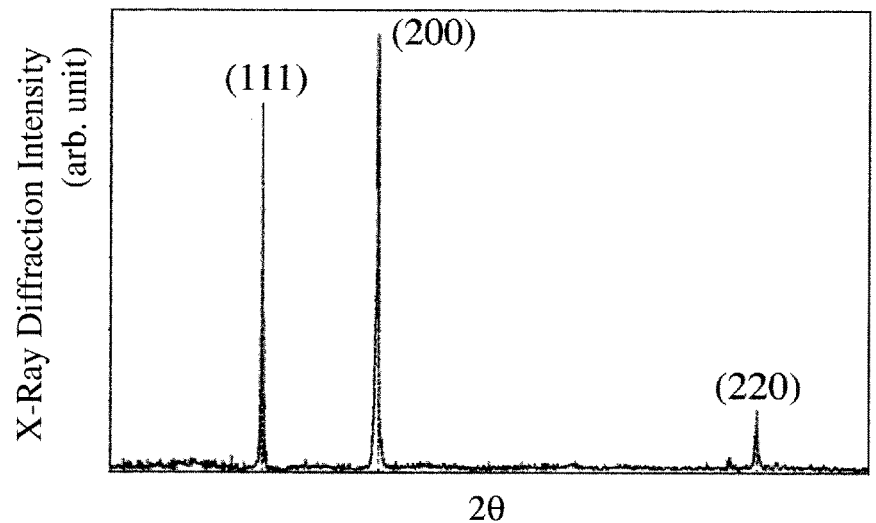
FIG. 6 is a graph showing an X-ray diffraction profile of a Ni plating film obtained in Example 3.
Figure 7:
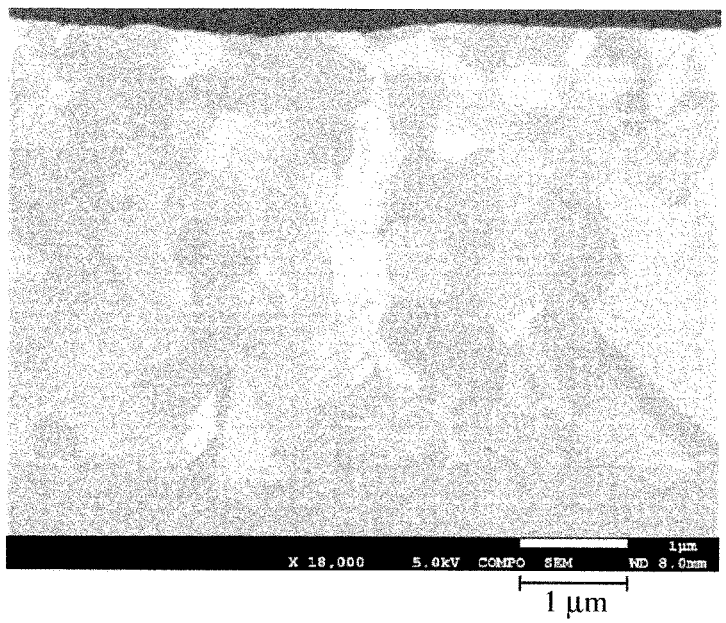
FIG. 7 is a SEM photograph showing a cross section of the Ni plating film of Example 3.
Figure 8:
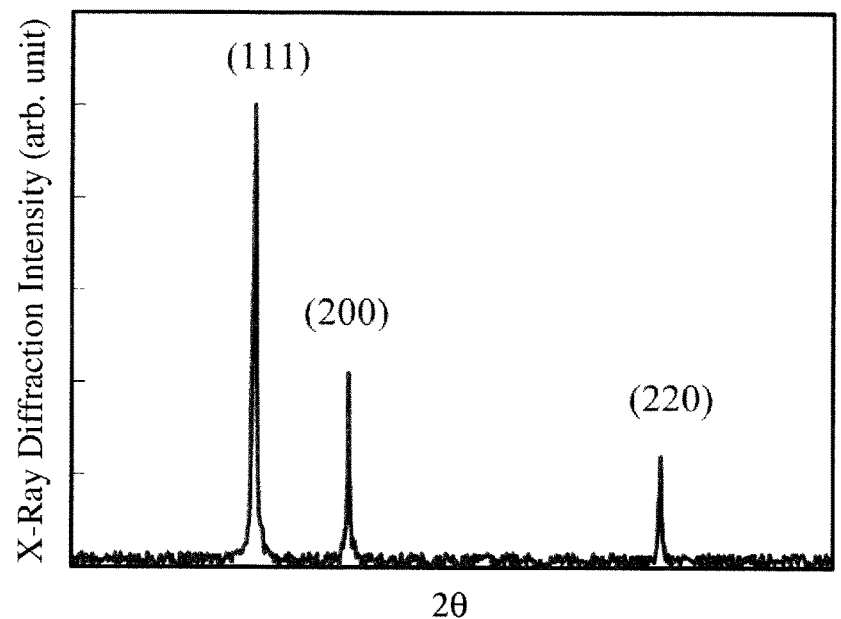
FIG. 8 is a graph showing an X-ray diffraction profile of a Ni plating film obtained in Comparative Example 1.
Figure 9:
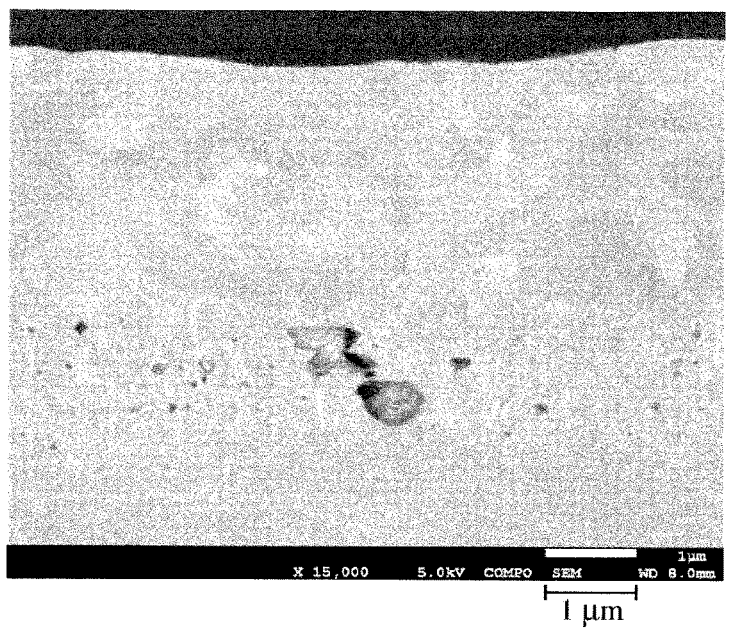
FIG. 9 is a SEM photograph showing a cross section of the Ni plating film of Comparative Example 1.

Each combined oil control ring having a nominal diameter of 82.5 mm, a combined nominal width of 2.5 mm, a combined thickness of 2.8 mm, and a tension of 23±3.0 N was produced under the same plating and production conditions as in Example 1, except for changing the current density and the initial pH as shown in Table 1, and adjusting the plating time to form a film as thick as about 5 μm. The measurements of the hardness before and after heat treatment, surface roughness after heat treatment, and X-ray diffraction of the Ni plating film, as well as the SEM observation of its structure, were conducted as in Example 1, and the measurements of the thickness and surface hardness of the nitrided layer, and the tension of the combined oil control ring were also conducted as in Example 1. The results are shown in Tables 1 and 2. Tables also show various test results of Example 1. The X-ray diffraction profile and SEM cross section photograph of the film of Example 3 are shown in FIGS. 6 and 7, and the X-ray diffraction profile and SEM cross section photograph of the film of Comparative Example 1 are shown in FIGS. 8 and 9.

TABLE 1

| | Ni Plating Film | | | | | | | |
|---|---|---|---|---|---|---|---|---|
| | Plating Conditions | | Hardness HV0.01 | | | X-Ray Diffraction | | Structure |
| No. | CD[1] (A/dm²) | Initial pH | Before HT[2] | After HT[2] | $Ra_{75}$[3] (μm) | $I_{(111)}/I_{(200)}$ | TC[4] of (200) | Fine Columnar Crystals |
| Example 1 | 8 | 2.8 | 435 | 245 | 0.16 | 1.25 | 1.35 | No |
| Example 2 | 5 | 3.1 | 495 | 291 | 0.21 | 0.90 | 2.03 | No |
| Example 3 | 5 | 3.3 | 448 | 208 | 0.18 | 0.78 | 1.86 | No |
| Example 4 | 10 | 4.7 | 472 | 198 | 0.14 | 1.75 | 1.23 | No |
| Example 5 | 10 | 3.2 | 453 | 212 | 0.07 | 1.96 | 1.13 | No |
| Com. Ex. 1 | 10 | 6.4 | 465 | 315 | 0.23 | 2.22 | 0.86 | Yes |
| Com. Ex. 2 | 10 | 5.2 | 438 | 274 | 0.19 | 2.38 | 0.96 | Yes |
| Com. Ex. 3 | 15 | 4.0 | 480 | 301 | 0.29 | 3.33 | 0.80 | Yes |

Note:
[1]CD means current density.
[2]HT means heat treatment.
[3]Surface roughness $Ra_{75}$.
[4]TC means a texture coefficient.

TABLE 2

| | Nitrided Layer Thickness (μm) | Tension Measurement | | | |
|---|---|---|---|---|---|
| | | Average Tension (N) | Standard Deviation (N) | Process Capability Index | |
| No. | | | | Cp | Cpk |
| Example 1 | 27 | 22.91 | 0.31 | 3.23 | 3.13 |
| Example 2 | 43 | 23.27 | 0.28 | 3.57 | 3.25 |
| Example 3 | 31 | 23.18 | 0.29 | 3.12 | 3.22 |

TABLE 2-continued

| | Nitrided Layer Thickness (μm) | Tension Measurement | | | |
|---|---|---|---|---|---|
| No. | | Average Tension (N) | Standard Deviation (N) | Process Capability Index Cp | Cpk |
| Example 4 | 35 | 23.18 | 0.34 | 2.94 | 2.76 |
| Example 5 | 37 | 23.13 | 0.39 | 2.56 | 2.45 |
| Com. Ex. 1 | 39 | 25.79 | 0.61 | 1.64 | 0.11 |
| Com. Ex. 2 | 34 | 27.21 | 0.67 | 1.49 | −0.60 |
| Com. Ex. 3 | 33 | 26.25 | 0.65 | 1.55 | 0.56 |

It was found in Examples 1-5 and Comparative Examples 1-3 that plating films formed at current density in a range of 5-10 A/dm$^2$ and initial pH in a range of 2.8-4.7 and heat-treated at 600° C. for 30 seconds had hardness HV of 300 or less and $I_{(111)}/I_{(200)}$ of 2.0 or less, without fine columnar crystals having an average diameter of less than 0.2 μm. On the other hand, higher initial pH provided $I_{(111)}/I_{(200)}$ of larger than 2.0, and fine columnar crystals having an average diameter of less than 0.2 μm as shown in the SEM photograph of FIG. 9. Further, defects were observed in the structure containing fine columnar crystals having an average diameter of less than 0.2 μm.

The nitrided layers in Examples 1-S and Comparative Examples 1-3 were as thick as 27-43 μm. In Examples 1-5, the tension measured was 23 N on average, substantially a target value, with standard deviation of 0.28-0.39 N, and sufficient process capabilities of 2.56-3.57 as Cp and 2.45-3.25 as Cpk were obtained. In Comparative Examples 1-3, on the other hand, Cpk was extremely low among the process capabilities; Cpk was minus, for example, in Comparative Example 2, failing to meet the average tension standard.

[10] Durability Test 1 Using Actual Engine

In a four-cylinder gasoline engine having displacement of 2400 cm$^3$, each oil ring of Examples 1-4 was used in each cylinder, to conduct an actual-engine durability test under the operation conditions of 6,500 rpm with wide open throttle (WOT). A top ring and a second ring were those commonly used for this engine. The tension of each oil ring measured after a predetermined period of time was 22.15 N in Example 1, 22.34 N in Example 2, 22.11 N in Example 3, and 22.26 N in Example 4, all sufficiently meeting the standard. No decrease in tension due to the wearing of seating tabs of the spacer expander was observed at all.

[11] Oil Sludge Resistance Test 1 Using Actual Engine

Using the same actual engine as in the above durability test, with each oil ring of Examples 1-4 used in each cylinder, an actual-engine oil sludge resistance test was conducted with a degraded engine oil recovered from the market, in an operation range from a stopped state to a maximum-power rotation state, under the cyclic operation of continuously changing temperatures of coolant and lubricant from a low temperature to a high temperature. In this test, too, a top ring and a second ring were those commonly used for this engine. After a predetermined period of time passed, a piston was taken out of each cylinder to observe the oil ring. As a result, it was confirmed that the spacer expander was not stuck to the side rail. After the oil ring was removed from a piston and ultrasonically washed with acetone for a predetermined period of time, it was also confirmed that only a trace amount of deposits were attached to the oil ring, indicating that the combined oil control rings of Examples 1-4 had excellent oil sludge resistance.

Example 6

A combined oil control ring having a nominal diameter of 75.0 mm, a combined nominal width of 2.0 mm, a combined thickness of 2.5 mm, and tension of 7.5±2.0 N was produced in the same manner as in Example 1, except that a spacer expander was formed by a belt-like hoop wire of SUS304 rolled to 2.2 mm×0.275 mm (0.3 R at ends), and that a side rail was formed by a belt-like hoop wire of SUS440B rolled to 2.00 mm×0.40 mm (0.3 R at ends). The combined oil control ring of Example 6 had average tension of 7.23 N, with standard deviation of 0.33 N, Cp of 2.02, and Cpk of 1.75.

[12] Durability Test 2 Using Actual Engine

In a four-cylinder gasoline engine having displacement of 1500 cm$^3$, the combined oil control rings of Example 6 were used in all of four cylinders, to carry out an actual-engine durability test under the operation conditions of 6,000 rpm with wide open throttle (WOT). A top ring and a second ring were those commonly used for this engine. The tension of each oil ring measured after a predetermined period of time was 7.15 N, 7.09 N, 7.12 N, and 7.04 N, all sufficiently meeting the standard. No decrease in tension due to the wearing of seating tabs of the spacer expander was observed at all.

[13] Oil Sludge Resistance Test 2 Using Actual Engine

In Example 6, too, the above engine having displacement of 1500 cm$^3$ was used to carry out an actual-engine oil sludge resistance test. The combined oil control rings of Example 6 were used in all four cylinders. After a predetermined period of time passed, a piston was taken out of each cylinder to observe the oil ring. As a result, it was confirmed that the spacer expander was not stuck to the side rail. After the oil ring was removed from a piston and ultrasonically washed with acetone for a predetermined period of time, it was also confirmed that only a trace amount of deposits were attached to the oil ring, indicating that the low-tension combined oil control ring had excellent oil sludge resistance.

Effects of the Invention

In the combined oil control ring of the present invention, a plating film formed on a belt-like hoop wire for a spacer expander has a crystal structure 5 having a high (200) plane ratio with suppressed preferential orientation of a (111) plane, thereby being substantially free from defects, and resistant to chipping and peeling. This plating film surely functions as a nitridation-preventing film, enabling the formation of a thick nitrided layer on side-rail-pushing surfaces of seating tabs of the spacer expander. A plating film having a centerline-average surface roughness $Ra_{75}$ of 0.005-0.4 μm can further suppress the sticking of oil sludge, providing a low-tension combined oil control ring having small tension variation and excellent wear resistance and sludge resistance, contributing to reducing fuel consumption even in a severe environment provided by improved combustion efficiency.

What is claimed is:
1. A combined oil control ring comprising:
a pair of annular side rails each having a gap; and
an axially corrugated spacer expander arranged between said side rails,
said corrugated spacer expander having, on an inner side, seating tabs for pushing inner peripheral surfaces of said side rails, a side-rail-pushing surface of each seating tab being provided with a nitrided layer, an entire surface of each spacer expander except for those provided with said nitrided layer being coated with a plating film, and said plating film having Vickers hardness HV0.01 of 300 or less, wherein in an X-ray diffraction profile of a plating film surface, a texture coefficient of a (200) plane is 1.1 or more.

2. The combined oil control ring according to claim 1, wherein a ratio $[I_{(111)}/I_{(200)}]$ of a diffraction intensity $I_{(111)}$ of a (111) plane to a diffraction intensity $I_{(200)}$ of a (200) plane is 2.0 or less.

3. The combined oil control ring according to claim 1, wherein said plating film does not contain columnar crystals having an average diameter of less than 0.2 μm.

4. The combined oil control ring according to claim 1, wherein said plating film is as thick as 1-7 μm.

5. The combined oil control ring according to claim 1, wherein said plating film has a centerline-average roughness $Ra_{75}$ of 0.005-0.4 μm.

6. The combined oil control ring according to claim 1, wherein said plating film is a Ni plating film.

7. The combined oil control ring according to claim 1, wherein said nitrided layer is as thick as 30 μm or more.

8. The combined oil control ring according to claim 1, wherein combined tension is 5-20 N.

9. The combined oil control ring according to claim 1, wherein said plating film has Vickers hardness HV0.01 of 270 or less.

10. The combined oil control ring according to claim 1, wherein said plating film has Vickers hardness HV0.01 of 250 or less.

* * * * *